United States Patent [19]
Charlton

[11] 3,941,438

[45] Mar. 2, 1976

[54] DYNAMOELECTRIC MACHINE WITH IMPROVED LUBRICATION WICKING SYSTEM

[75] Inventor: Thomas Charlton, Lima, Ohio

[73] Assignee: Westinghouse Electric Corporation, Pittsburgh, Pa.

[22] Filed: May 12, 1975

[21] Appl. No.: 576,949

[52] U.S. Cl. ............................................. 308/132
[51] Int. Cl.² B61F 17/00; F16C 1/24; F16C 13/02; F16C 33/66
[58] Field of Search ............... 308/78, 132, 92, 106; 260/2.5 A; 252/14

[56] References Cited
UNITED STATES PATENTS

| | | | |
|---|---|---|---|
| 3,030,157 | 4/1962 | Dederick | 308/132 |
| 3,038,764 | 6/1962 | Dimke | 308/132 |
| 3,336,092 | 8/1967 | Dochterman | 308/132 |
| 3,361,496 | 1/1968 | Cunningham | 308/132 |
| 3,423,138 | 1/1969 | Hardy | 308/132 |
| 3,829,178 | 8/1974 | Sakamoto | 308/132 |

Primary Examiner—Lloyd L. King
Attorney, Agent, or Firm—G. H. Telfer

[57] ABSTRACT

Sleeve type rotor bearings with a wicking arrangement for continuously supplying oil to the bearing surface including a feeder wick extending from within the bearing housing through a window in the bearing surface to contact the rotating shaft, a mass of particulate wicking material in close contact with surfaces of the feeder wick and giving up lubricant to the feeder wick, and a collector wick that is ring shaped and has a surface abutting against an end of the mass of particulate wicking material and is exposed to an oil flinger mounted on the shaft; the collector wick comprises an open cell foamed plastic material whose density and lubricant retentivity is less than either the feeder wick or the mass of particulate wicking material. The arrangement provides good oil collection without encountering problems of oil runout.

9 Claims, 1 Drawing Figure

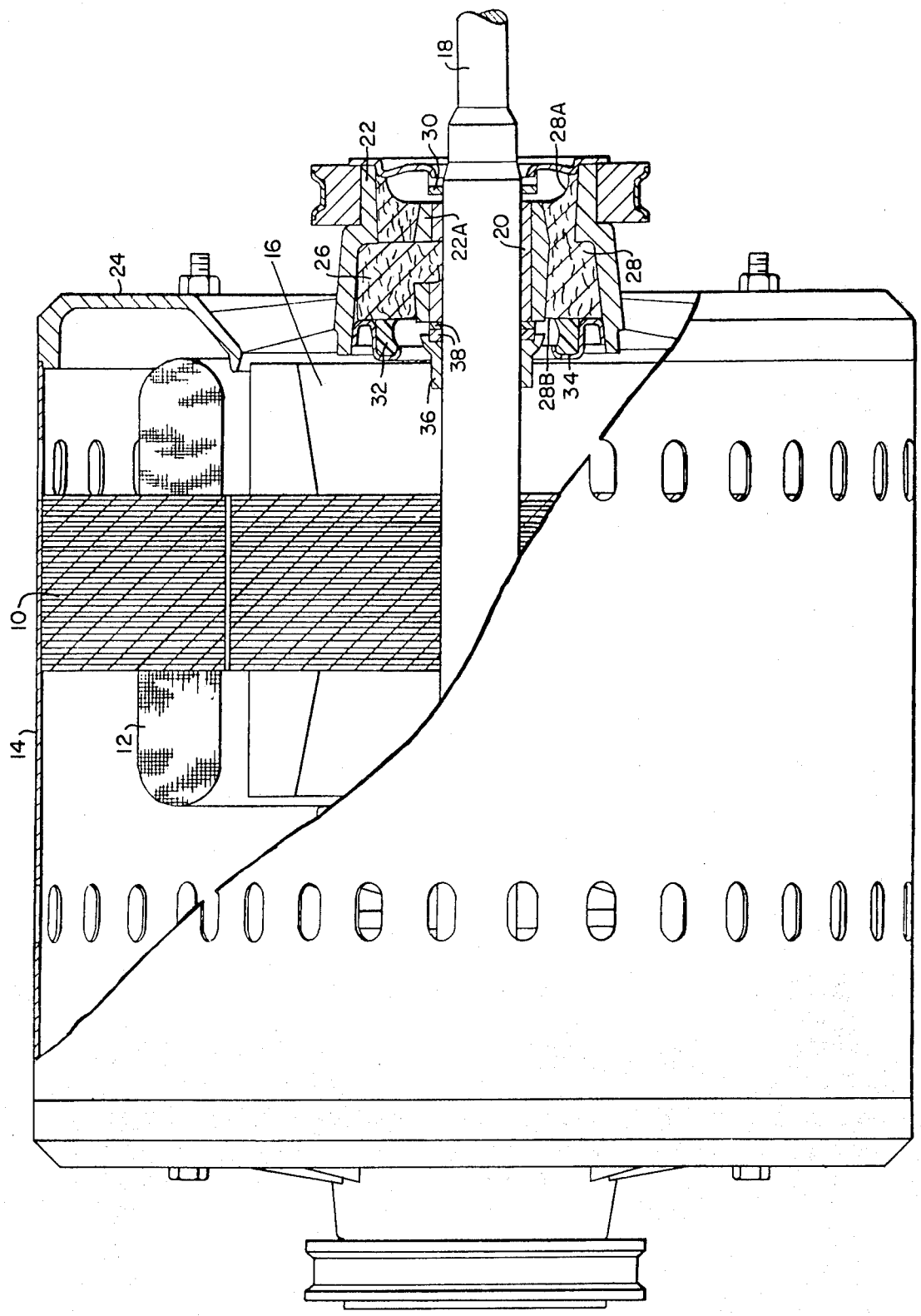

DYNAMOELECTRIC MACHINE WITH IMPROVED LUBRICATION WICKING SYSTEM

BACKGROUND OF THE INVENTION

This invention relates generally to dynamoelectric machines and, more particularly, to fluid lubricant (oil) wicking arrangements for maintaining lubricant at the bearing surface.

In small motors, such as fractional horsepower motors, the practice has been to use sleeve bearings in a housing filled with wicking material for retaining an appreciable quantity of oil and supplying it as needed to the bearing surface. The wicking material may be any of a variety of shredded or particleized materials compacted together to a suitable density for oil retention. Wool felt has been a widely used material as have cellulosic materials such as those made of wood fibers or cotton linters as disclosed in U.S. Pat. Nos. 2,966,459 and 3,466,244 respectively. A frequently used arrangement is one in which the bulk of the wicking material comprises cellulosic fibers as in the referred to patents in combination with a feeder wick, such as of wool felt, that extends from the bearing housing in intimate contact with the cellulosic wicking material through a window in the bearing sleeve for supplying oil to the bearing surface. Such an arrangement is shown, for example, in U.S. Pat. No. 3,184,272.

Another type of wicking material that has been proposed is exemplified by U.S. Pat. No. 3,190,842, issued June 22, 1965 which relates to open cell foamed plastic material such as polyurethanes. While feasibility of such materials as oil wicks is believed to exist, experience by the present inventor with open cell plastic material tends to indicate that readily available materials are not of sufficient density or do not have sufficiently small cell openings for adequate oil retention and therefore have not superseded materials such as the cellulosic particulate wicking materials referred to above.

Self-lubricated bearings are those in which provision is made to return oil from the shaft to the wicking material so as to require no lubrication or very infrequent lubrication during normal operation. This is accomplished by having one or more radially projecting elements mounted on the shaft that both tend to prevent axial flow of the lubricant away from bearings and also as oil builds up, fling it radially outward where it is collected by an exposed surface of the wicking material. It is found that such lubrication arrangements can sometimes prove defective because wicking material from the exposed surface becomes loose and strings of it extend from their intended location down to the shaft. As a result, oil can run along the shaft away from the oil flinger and the bearing. While most likely to occur in vertically mounted motors, this problem can also occur in horizontally mounted motors.

SUMMARY OF THE INVENTION

Briefly, in accordance with the present invention, sleeve type rotor bearings are provided with a wicking arrangement for continuously supplying oil to the bearing surface including a feeder wick (such as wool felt) extending from within the bearing housing through a window in the bearing surface to contact the rotating shaft, a mass of particulate wicking material (such as cellulosic fibers) in close contact with surfaces of the feeder wick and giving up lubricant to the feeder wick, and a collector wick that is ring shaped and has a surface abutting against an end of the mass of particulate wicking material and is exposed to an oil flinger mounted on the shaft; the collector wick comprises an open cell foamed plastic material whose density and lubricant retentivity is less than either the feeder wick or the mass of particulate wicking material. The arrangement provides good oil collection without encountering problems of oil runout.

The arrangement of this invention including the collector wick could be used on both the in-board and out-board ends of the bearing. However, considerable benefit is achieved by employing the collector wick only on the in-board end of the bearing because the molding of a suitable collecting surface of particulate wicking material at the out-board end is easier to achieve and for reasons of economy a collector wick of open cell foam plastic may be omitted at that end of the bearing.

BRIEF DESCRIPTION OF THE DRAWINGS

The single figure of the drawing is an elevation view, partly in section, of a dynamoelectric machine in accordance with an embodiment of the present invention.

DESCRIPTION OF THE PREFERRED EMBODIMENT

Referring to the drawing, there is shown a dynamoelectric machine having the general characteristics and structural features of conventional small AC induction motors and including a cylindrical stator core 10 containing windings 12 and mounted within a frame 14. A rotor 16 mounted on a shaft 18 is located within the stator 10. The shaft 18 is supported by each end of the frame by a bearing 20 within a housing 22. The bearing housing 22 is part of or is supported by an end bell 24 secured to the stationary frame 14. The illustrated motor is merely an example of a type of dynamoelectric machine which may incorporate the invention. Its general features are well known to the art and will not be described in detail. Other configurations of dynamoelectric machines with which the invention may be practiced will be apparent to those skilled in the art.

Referring to the portion of the structure more directly related to the present invention, the lubrication system is enclosed in each end bell 24 which provides support to sleeve bearing 20 as well as the housing 22 for confining wicking material. The inner cylindrical wall 22A of the housing supports sleeve bearing 20 and both have windows through which a feeder wick 26 extends to make intimate contact with the shaft 18.

The major portion of the housing is filled with a mass of particulate wicking material 28, such as of cotton linters fibers mixed with oil, pumped into the housing to surround and make intimate contact with the feeder wick 26. The feeder wick 26 is preferably a compacted member of wool felt and is more dense than the mass 28 of particulate wicking material so that it is more retentive of oil and causes oil to be withdrawn from the wicking material 28 into the feeder wick 26 and maintain the feeder wick in a substantially saturated condition.

The description of U.S. Pat. Nos. 2,996,459, 3,466,244 and 3,184,272 are incorporated herein by reference as to suitable particulate wicking materials and their use with feeder wicks. As used herein "particulate wicking material" includes fibers which are preferred but is not necessarily so limited.

The mass of particulate wicking material 28 maintains its shape when it is pumped into the housing 22 and the restrictive tooling is removed. Such is the case, for example, at the exposed outer surface 28A which provides clearance for the outboard oil flinger 30. The oil flinger disc or ring 30 picks up oil flowing down shaft 18 and flings it radially and is picked up at surface 28A and returned to wicking material 28. In this arrangement the outboard oil flinger 30 and wicking surface 28A is essentially as has been practiced previously.

A collector wick 32 is placed in intimate contact with the surface 28B of the particulate wicking material in accordance with the present invention. The collector wick 32 is of open celled foam plastic material, preferably pre-molded, then cut to desired size and shape and is held in position by a bearing cap 34 that fits securely within the cavity of housing 22 and has a portion bearing against the exposed surfaces of the particulate wicking material 28 and the feeder wick 26.

As shown, the collector wick 32 may contact the feeder wick 26 directly. This is not necessary however and the feeder wick may be confined to a more limited volume of the housing with the collector wick only contacting the particulate wicking material. The illustrated arrangement is preferred as it maintains the feeder wick 26 securely in place in the bearing window.

The collector wick 32 has a density which is appreciably lower than that of either of the feeder wick 26 or the particulate wicking material 28 which means that it will not draw oil from those elements but will give up oil that it collects. The collector wick receives oil from an in-board sleeve flinger 36 located on the shaft 18 radially inside the collector wick. The sleeve flinger 38 is an element encircling the shaft adjacent thrust washers 38 and has an edge that will throw oil from the shaft radially outward to the collector wick. Oil flingers as used in prior practice may be employed in the present invention.

The foam plastic material from which the collector wick 32 is made may be any of numerous commercially available open cell foam plastic materials such as polyether-urethane materials sold under the trade designations Omalon 3 and Omalon 5 by Crofton Inc. Such materials have a characteristic that they cut with an even surface without any protrusion. By contrast, Wool felt has a tendency to retain fibers that protrude from the cut surface or actually migrate within the mass after cutting and are sometimes referred to as whiskers. These whiskers will bridge the lip of the bearing cap and cause oil to leak from the system over the lip or will defeat the purpose of the oil flinger if they rub the out-board side of the flinger near the bearing cap lip.

Besides returning to the wicking material 28 oil collected from the oil flinger 36, the collector wick 32 absorbs free oil that may come from the wicking material 28 when the system is heated to an unusually high temperature. It will absorb the free oil and return the oil when the system cools down to the wicking material.

The problem of loss of oil not only affects bearing characteristics, but also electrical switch components within the motor can be affected by oil contributing to premature switch failure.

In prior practice where the wicking material 28 was molded to perform the same function as the collector wick 32, it was very difficult to maintain the desired shape. The wicking material would frequently completely fill the bearing cap at the lip and leakage could result. At other times free particles of wicking material lodged near the lip could migrate and touch the oil flinger to result in defeating the purpose of the oil flinger and causing leaks.

It is therefore seen that the present invention provides an improved oil wicking system that is relatively simple to implement and yet effectively avoids oil leaks.

What is claimed is:

1. A dynamoelectric machine with an improved lubrication system and comprising:
    a stator;
    a rotor within said stator and located on a shaft;
    at least one bearing for permitting rotation of said shaft and rotor, said bearing comprising a cylindrical sleeve type bearing surface mounted in a housing secured to said stator;
    a wicking arrangement for continuously supplying liquid lubricant to said bearing surface, said wicking arrangement comprising a feeder wick extending from within said housing through a window in said bearing surface to contact said shaft, a mass of particulate wicking material within said housing away from said window and in close contact with surfaces of said feeder wick, said mass of wicking material being less lubricant retentive than said feeder wick, a collector wick that is ring shaped and secured within said housing and has a surface abutting against an end of said mass of particulate wicking material, said collector wick being proximate and exposed to a lubricant flinger mounted on said shaft, said collector wick comprising an open celled foamed plastic material whose density and lubricant retentivity is less than said feeder wick and said mass of particulate wicking material.

2. The combination of claim 1 wherein:
    said mass of particulate wicking material comprises fibers of cellulosic material.

3. The combination of claim 1 wherein:
    said feeder wick comprises wool felt compacted to a greater density than said mass of particulate wicking material.

4. The combination of claim 1 wherein:
    said housing comprises a cup shaped member integrally associated with an end bell secured to said stator.

5. The combination of claim 1 wherein:
    said collector wick and said lubricant flinger are located proximate the axially inward end of said housing and said arrangement further comprises an additional lubricant flinger mounted on said shaft proximate the axially outward end of said housing and said mass of particulate wicking material has an annular surface exposed to said additional lubricant flinger.

6. The combination of claim 1 wherein:
    said mass of particulate wicking material substantially fills the space within said housing except where occupied by said feeder wick.

7. The combination of claim 1 further comprising:
    a bearing end cap is secured to the axially inward end of said housing and holds said collector wick compressibly in place against said mass of particulate wicking material.

8. The combination of claim 1 wherein:
    said collector wick has a density appreciably lower than that of said feeder wick or said mass of particulate wicking material.
9. The combination of claim 7 wherein:
said bearing end cap has a first portion bearing axially against said collector wick and a second portion bearing axially against a surface of said feeder wick.

* * * * *